US012812233B2

(12) United States Patent
Lu et al.

(10) Patent No.: US 12,812,233 B2
(45) Date of Patent: Nov. 24, 2026

(54) VIDEO PROCESSING METHOD AND APPARATUS, COMPUTER DEVICE, AND STORAGE MEDIUM

(71) Applicant: Arashi Vision Inc., Shenzhen (CN)

(72) Inventors: Sheng Lu, Shenzhen (CN); Jun Zheng, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 253 days.

(21) Appl. No.: 18/755,741

(22) Filed: Jun. 27, 2024

(65) Prior Publication Data

US 2024/0348912 A1 Oct. 17, 2024

Related U.S. Application Data

(63) Continuation of application No. PCT/CN2022/141774, filed on Dec. 26, 2022.

(30) Foreign Application Priority Data

Dec. 26, 2022 (CN) ........................ 202111619488.2

(51) Int. Cl.
*H04N 23/611* (2023.01)
*G06T 7/20* (2017.01)
(Continued)

(52) U.S. Cl.
CPC ............. *H04N 23/611* (2023.01); *G06T 7/20* (2013.01); *G06T 7/70* (2017.01); *H04N 23/698* (2023.01); *G06T 2207/20132* (2013.01)

(58) Field of Classification Search
CPC .... H04N 23/611; H04N 23/698; H04N 23/60; H04N 23/61; H04N 23/62; H04N 23/631;
(Continued)

(56) References Cited

U.S. PATENT DOCUMENTS

2018/0367777 A1* 12/2018 Li ........................ H04N 23/698
2019/0220953 A1* 7/2019 Zhou .................. H04N 21/8547
2021/0227132 A1* 7/2021 Cai ...................... H04N 23/695

FOREIGN PATENT DOCUMENTS

CN 110225402 A 9/2019
CN 111182218 A 5/2020
(Continued)

OTHER PUBLICATIONS

International Search Report and Written Opinion mailed on Mar. 17, 2023, received for PCT Application PCT/CN2022/141774, filed on Dec. 26, 2022, 8 pages including English Translation.
(Continued)

*Primary Examiner* — Stephen P Coleman
(74) *Attorney, Agent, or Firm* — XSENSUS LLP

(57) ABSTRACT

Embodiments described in the present application provide a video processing method, device, computer equipment, and storage medium, displaying a video picture of a panoramic video through a user interface, and, in response to a selection operation on the video picture, determining a target object to be photographed in the panoramic video, then, acquiring a target shooting field of view of the target object in the video picture, and in response to the video shooting instruction, performing video recording on the target object based on the target shooting field of view to generate a target planar video. The embodiment of the present application can simplify the steps of obtaining the target planar video from the panoramic video and improve the efficiency of acquiring a target planar video from a panoramic video.

19 Claims, 2 Drawing Sheets

(51) Int. Cl.
*G06T 7/70* (2017.01)
*H04N 23/698* (2023.01)

(58) Field of Classification Search
CPC ...... H04N 23/635; H04N 23/695; G06T 7/20; G06T 7/70; G06T 2207/20132
USPC .......................................................... 382/103
See application file for complete search history.

(56) References Cited

FOREIGN PATENT DOCUMENTS

| | | | | | |
|---|---|---|---|---|---|
| CN | 111327823 | A | | 6/2020 | |
| CN | 113766129 | A | | 12/2021 | |
| KR | 20200136649 | A | | 12/2020 | |
| WO | 2018/032921 | A1 | | 2/2018 | |
| WO | WO-2021170123 | A1 | * | 9/2021 | ............. H04N 23/64 |

OTHER PUBLICATIONS

Office Action issued Mar. 26, 2025 in Chinese Patent Application No. 202111619488.2 with English translation thereof.
Office Action issued Aug. 26, 2025 in Chinese Patent Application No. 202111619488.2 with machine English translation thereof.

* cited by examiner

VIDEO PROCESSING METHOD AND APPARATUS, COMPUTER DEVICE, AND STORAGE MEDIUM

CROSS-REFERENCE TO RELATED APPLICATIONS

This application is a continuation of International Application No. PCT/CN2022/141774, with an international filing date of Dec. 26, 2022, which is based upon and claims priority to Chinese Patent Application No. 202111619488.2, filed with the Chinese Patent Office on Dec. 27, 2021, titled "Video processing method and device, computer equipment and storage medium", the entire contents of each are incorporated herein by reference.

TECHNICAL FIELD

The embodiments of the present application relate to the technical field of information processing, and in particular, to a video processing method, device, computer equipment, and storage medium.

BACKGROUND

With the continuous development of communication technology and the popularization and application of computer equipment such as smart phones, tablet computers and notebook computers, computer equipment is developing in a diversified and personalized fashion, and has increasingly become an indispensable equipment in people's life and work. Nowadays, electronic devices such as mobile phones and tablet computers have become computer devices carried by the public every day. Users can use electronic devices to take videos and photos according to their own needs. In order to enable users to watch the restoration display of the real scene interactively in all directions, the users can use the panoramic shooting method to shoot the real scene, giving the user a 360-degree full-scale image of the real scene with a three-dimensional sense.

At present, since the panoramic video generated by the panoramic shooting method generally involves image data from multiple directions, when obtaining the image data of a certain target direction, due to the complexity of the image data, the image generation steps are too cumbersome, resulting in low efficiency in retrieving the image data of the target direction.

SUMMARY

Embodiments of the present application provide a video processing method, device, computer equipment, and storage medium, which can acquire target objects in panoramic videos to generate planar videos, and can determine the planar videos requested by users from panoramic videos according to users' personalize needs, thereby can simplify the steps of obtaining the target planar video from the panoramic video. Thus, the efficiency of obtaining the target planar video from the panoramic video can be improved.

In accordance with various embodiments, a video processing method can comprise: displaying a picture of a panoramic video through a user interface; determining a target object to be photographed in the panoramic video in response to a selection operation on the picture; acquiring a target shooting field of view of the target object in the picture; and, in response to a video shooting instruction, performing video recording on the target object based on the target shooting field of view to generate a target planar video.

In accordance with various embodiments, a video processing device can comprise: one or more processors; a memory; and one or more computer programs, stored in the memory and configured to be executed by the one or more processors, when the processor executes the computer program, the processor perform the steps comprising: displaying a video picture of a panoramic video through a user interface; determining a target object to be photographed in the panoramic video in response to a selection operation on the video picture; acquiring a target shooting field of view of the target object in the video picture; and, in response to a video shooting instruction, performing video recording on the target object based on the target shooting field of view to generate a target planar video.

In accordance with various embodiments, a non-transitory computer-readable storage medium that stores one or more computer programs, wherein when the one or more computer programs are executed by one or more processors, cause the one or more processors to perform the steps comprising: displaying a video picture of a panoramic video through a user interface; determining a target object to be photographed in the panoramic video in response to a selection operation on the video picture; acquiring the target shooting field of view of the target object in the video picture; and, in response to a video shooting instruction, performing video recording on the target object based on the target shooting field of view to generate a target planar video.

In accordance with various embodiments, a video processing device can comprise: a display unit, configured to display a video picture of the panoramic video through the user interface; a determining unit, configured to determine a target object to be photographed in the panoramic video in response to a selection operation on the video picture; an acquisition unit, configured to acquire a target shooting field of view of the target object in the video picture; and a generating unit configured to, in response to a video shooting instruction, perform video recording on the target object based on the target shooting field of view to generate a target planar video.

In some embodiments, the video processing device further comprises a first generating subunit, configured to generate a target shooting area based on the target object, wherein the target object is located at a central position of the target shooting area.

In some embodiments, the video processing device further comprise a second generating subunit, configured to, in response to a video shooting instruction, perform video tracking and recording on the target shooting area based on the target shooting field of view, and generate a target planar video.

In some embodiments, the video processing device can comprise: a first determining subunit configured to perform a real-time tracking operation on the target object, and determine the real-time position of the target object in a video picture of the panoramic video; a second determining subunit configured to determine the real-time video frame in the target shooting area in the video picture of the panoramic video based on the real-time position; and a third generating subunit configured to perform video tracking and recording on the real-time video frames in the target shooting area to generate the target planar video.

In some embodiments, the video processing device can comprise a detection unit that is configured to stop video tracking recording when it is detected that the target object does not appear in the video picture of the panoramic video.

In some embodiments, the video processing device can comprise: a third determining subunit, configured to determine a designated shooting area on the user interface in response to a touch operation on the user interface; and a fourth determining subunit that is used to determine a video picture of the panoramic video in the specified shooting area as the target object that needs to be photographed in the panoramic video.

In some embodiments, the video processing device can comprise a fourth generating subunit that is configured to, in response to a video shooting instruction, perform video recording of video frames in the designated shooting area based on a preset shooting field of view of the designated shooting area, to generate a target planar video.

In some embodiments, the video processing device can comprise: a fifth determining subunit, configured to determine a first position on the user interface in response to a pressing operation on the user interface; and a fifth generation subunit is configured to generate a designated shooting area with the first position and the second position as diagonal corners of a rectangle when it is detected that the press operation is released at the second position on the user interface.

In some embodiments, the video processing device can comprise: a first response unit, configured to acquire a field of view adjustment parameter in response to a touch operation on the user interface; a first processing unit, configured to update the target shooting field of view based on the field of view adjustment parameter to obtain an updated target shooting field of view; and a sixth generating subunit, configured to perform video recording on the target object based on the updated target shooting field of view, and generate the target planar video according to the planar video recorded based on the target shooting field of view and the planar video recorded based on the updated target shooting field of view.

In some embodiments, the video processing device can comprise a first obtaining subunit that is configured to, in response to a sliding operation on the viewing angle adjustment control, obtain a viewing angle adjustment parameter corresponding to the sliding operation.

In some embodiments, the video processing device can comprise: a second acquiring subunit, configured to acquire media information input through the information input control; and a sixth determining subunit, configured to acquire the media information determined by the input determination operation when an input determination operation for the media information is detected, and determine a viewing angle adjustment parameter based on the media information.

In some embodiments, the video processing device can comprise: a third acquisition subunit is used to acquire video adjustment parameters; a second processing unit is used to crop the target planar video based on the video adjustment parameters to obtain the processed target planar video; and a first exporting unit is configured to export the target planar video based on a preset video format.

In some embodiments, the video processing device can comprise: a fourth acquiring subunit, configured to acquire the target planar video and the planar video to be processed; a third processing unit, configured to perform video splicing processing on the target planar video and the planar video to be processed to obtain a spliced planar video; and a second exporting unit, configured to export the spliced planar video based on a preset video format.

Correspondingly, the embodiment described in the present application also provides a computer device, including a processor, a memory, and a computer program stored in the memory and capable of running on the processor. When the computer program is executed by the processor, the steps of any one of the video processing methods can be implemented.

Correspondingly, an embodiment described in the present application further provides a storage medium, where a computer program is stored on the storage medium, and when the computer program is executed by a processor, the steps of any one of the video processing methods can be implemented.

Embodiments described in the present application provide a video processing method, device, computer equipment, and storage medium, displaying a video picture of a panoramic video through a user interface, and, in response to a selection operation on the video picture, determining a target object to be photographed in the panoramic video, then, acquiring a target shooting field of view of the target object in the video picture, and in response to the video shooting instruction, performing video recording on the target object based on the target shooting field of view to generate a target planar video. The embodiment of the present application can acquire a target object in a panoramic video to generate a target planar video, and can generate a target planar video from the panoramic video according to the user's personalized needs, thereby simplifying the steps of obtaining the target planar video from the panoramic video and improving the efficiency of acquiring a target planar video from a panoramic video.

DETAILED DESCRIPTION

Embodiments described in the present application provide a video processing method, device, computer equipment, and storage medium. In accordance with various embodiments, the video processing method may be executed by a computer device, where the computer device may be a device such as a terminal. The terminal can be a terminal device such as a smart phone, a tablet computer, a notebook computer, a touch screen, a game console, a personal computer (PC, Personal Computer), a personal digital assistant (Personal Digital Assistant, PDA), and the terminal can also include a client. The client can be a video application client, a music application client, a game application client, a browser client carrying a game program, or an instant messaging client.

Embodiments described in the present invention can provide a video processing method, device, terminal, and storage medium. The video processing method can be used with a terminal equipped with a camera device, such as a smart phone, a tablet computer, a notebook computer, or a personal computer. The video processing method, device, terminal and storage medium will be described below. It should be noted that the description sequence of the following embodiments is not intended to limit the preferred sequence of the embodiments.

Figure 1:
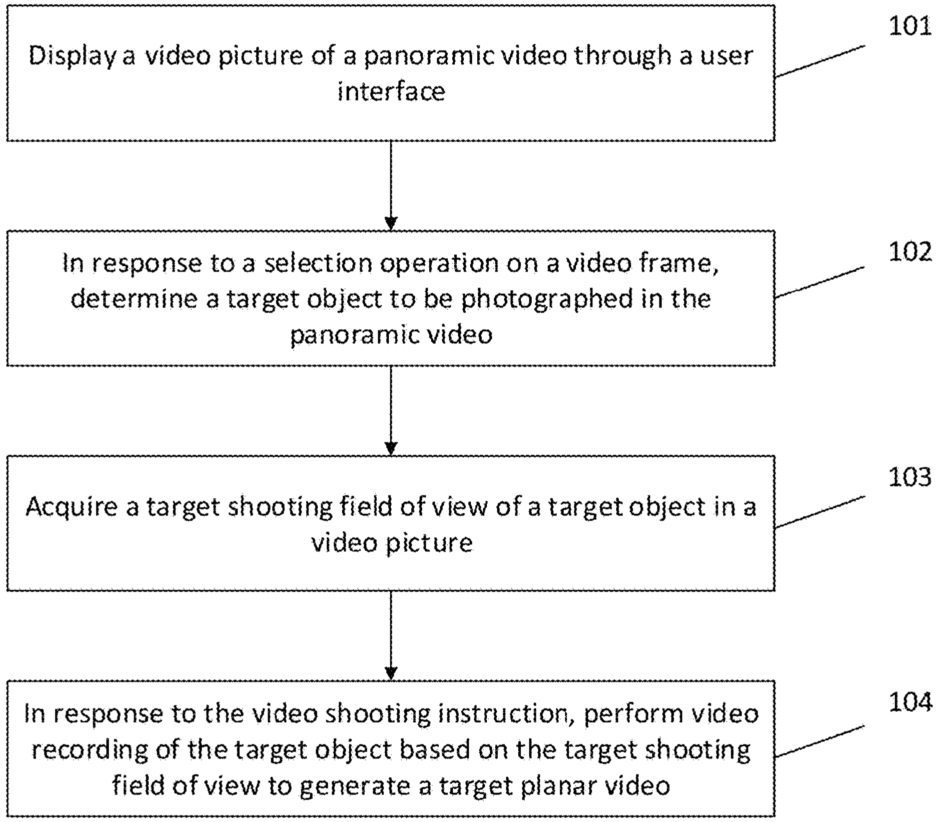
FIG. 1 is an exemplary schematic flowchart of a video processing method in accordance with various embodiments.

Referring to FIG. 1, FIG. 1 is an exemplary schematic flow diagram of a video processing method provided in accordance with various embodiments. As shown in FIG. 1, an exemplary video processing method can comprise the steps from step 101 to step 104.

Step 101. Display a video picture of a panoramic video through a user interface.

In accordance with various embodiments, a panoramic video can be a spherical video that is shot in a full range of 360 degrees by a 3D camera. In an embodiment, after selecting the shooting position through the camera device configured on the terminal (such as a mobile phone with a camera, a digital SLR camera with a fisheye lens, or a panoramic pan-tilt), panoramic video recording can be performed at the shooting position, and video picture of the panoramic video can be displayed through the user interface.

Step 102. In response to a selection operation on a video frame, determine a target object to be photographed in the panoramic video.

In various embodiments, the target object may include a target person or a target scene. In order to realize the tracking and shooting of the target object in the panoramic video, after the step of, in response to a selection operation on the video picture, determining the target object that needs to be photographed in the panoramic video, the method may comprise further step or steps, such as generating target shooting area based on the target object, wherein the target object is located at a central position of the target shooting area.

Furthermore, in the step of, in response to a video shooting instruction, performing video recording on the target object based on the target shooting field of view to generate a target planar video, the method may comprise further step or steps, such as, in response to the video shooting instruction, performing video tracking and recording on the target shooting area based on the target shooting field of view to generate a target planar video.

In order to realize the tracking and shooting of the target object in the panoramic video, the step of, in response to the video shooting instruction, performing video tracking and recording on the target shooting area based on the target shooting field of view to generate a target planar video, may include further steps, such as: performing a real-time tracking operation on the target object to determine a real-time position of the target object in a video picture of the panoramic video; determining a real-time video frame in the target shooting area in the video picture of the panoramic video based on the real-time position; and performing video tracking and recording on the real-time video images in the target shooting area to generate the target planar video.

In order to be able to prompt a user to generate a position of the target planar video in the panoramic video, when the panoramic video is recorded, the position of the target planar video in the panoramic video can be displayed in real time through a small window in the preset display area of the user interface. Thus, the position of the current planar video in the panorama video can be viewed in real time.

In order to shoot the target object in a targeted manner, the step of, in response to the video shooting instruction, performing video tracking and recording on the target shooting area based on the target shooting field of view to generate a target planar video, may include further step or steps such as, when it is detected that the target object does not appear in the video frame of the panoramic video, stopping the video tracking recording.

In order to shoot in a fixed area in the panoramic video and realize targeted shooting in a certain area of the panoramic video, in the step of determining the target object to be photographed in the panoramic video in response to the selection operation on the video screen, the method can include further steps such as: in respond to a touch operation on the user interface, determining a designated shooting area on the user interface; and determining a video picture of the panoramic video in the designated shooting area as a target object to be photographed in the panoramic video.

In accordance with one or more embodiments, the step of, in respond to the video shooting instruction, performing video recording on the target object based on the target shooting field of view to generate a target planar video, may include further step or steps such as, in response to the video shooting instruction, performing video recording on the video frames in the designated shooting area based on the preset shooting field angle of the designated shooting area to generate a target planar video.

In order to be able to determine the target shooting area, the step of determining a designated shooting area on the user interface in response to a touch operation on the user interface may include step or steps such as: determining a first position on the user interface in response to a pressing operation on the user interface; when it is detected that the pressing operation is released at a second position on the user interface, generating a designated shooting area with the first position and the second position as diagonal corners of a rectangle.

Step 103. Acquire a target shooting field of view of a target object in a video picture.

In accordance with various embodiments, the shooting device of the terminal may be configured with a corresponding target shooting field of view for the target object, for example, the target shooting field of view may be 120° or less than 120°.

For example, the field of view may also be called viewing angle, and the size of the field of view determines the extent of view of the optical instrument. In optical instruments, the angle formed by the lens of the optical instrument as the vertex and the two edges of the maximum range where the object image of the measured object can pass through the lens is called the field of view. The size of the field of view determines the extent of view of the optical instrument. The larger the field of view, the larger the extent of view and the smaller the optical magnification, that is, the target object to be photographed may not be captured in the lens if it exceeds the field of view, i.e., not captured in the video footage.

Step 104. In response to the video shooting instruction, perform video recording of the target object based on the target shooting field of view to generate a target planar video.

In order to be able to perform personalized adjustment on the shooting field of view of the target planar video when shooting, before the step of, in response to the video shooting instruction, performing video recording on the target object based on the target shooting field of view to generate a target planar video, the methods can include step or steps such as: in response to a touch operation on the user interface, acquiring a field of view adjustment parameter; updating the target shooting field of view based on the field of view adjustment parameter to obtain an updated target shooting field of view; and preforming video recording on the target object based on the updated target shooting field of view, and generating a target planar video according to the planar video recorded by the target shooting field of view and the planar video recorded by the updated target shooting field of view.

In order to realize the adjustment of the field of view, the shooting interface can display the field of view adjustment control. In the step of obtaining field of view adjustment parameters in response to a touch operation on the user interface, the method can include steps such as, in response to a sliding operation on the viewing angle adjustment control, acquiring a viewing angle adjustment parameter corresponding to the sliding operation.

Optionally, information input controls can be displayed on the shooting interface. In the step of obtaining field of view adjustment parameters in response to a touch operation on the user interface, the method can include step or steps such as: acquiring media information input through the information input control; and when an input determination operation for the media information is detected, acquiring the media information determined by the input determination operation, and causing a viewing angle adjustment parameter to be determined based on the media information.

As examples, the media information may include text information, voice information, image information and/or video information. The terminal can acquire text information, voice information, image information and/or video information input through the information input control through the information input control.

In various examples, when the media information is textual digital information, the textual digital information may be directly used as the field of view adjustment parameter. As for the media information being voice information, image information and/or video information, the corresponding media information may be processed to be converted into text information.

When the media information is image information, the terminal can use image recognition technology to identify the field of view parameter of the current image information, obtain text information corresponding to the field of view parameter, and directly use the text number information as a field of view adjustment parameter.

When the media information is video information, the video content of the video information can be divided into image frames, the field of view parameters of the image frames can be identified using image recognition technology, and the text information corresponding to the field of view parameters can be obtained. The information can be directly used as a field of view adjustment parameter.

When the target content is speech information, the speech recognition technology can be used to convert the speech into text content, and the semantic recognition technology can be used to identify the semantics of the text content, so as to obtain the text information corresponding to the speech information, and the text digital information can be directly used as a field of view adjustment parameter.

Optionally, after the step of generating the target planar video, the method may include step or steps such as: obtaining video adjustment parameters; performing cropping processing on the target planar video based on the video adjustment parameters to obtain the processed target planar video; and exporting the target planar video based on a preset video format.

Furthermore, after the step of generating the target planar video, the method may include step or steps such as: obtaining the target planar video and the planar video to be processed; performing video splicing processing on the target planar video and the planar video to be processed to obtain a spliced planar video; and exporting the spliced planar video based on a preset video format.

In an exemplary application scenario, before panoramic video recording, a target object can be selected for tracking. After the tracking picture is determined according to the target object, the terminal player can send the tracking position of the real-time tracking picture to the renderer for analysis, ensuring the target object to be always positioned in the central position of the video picture in the target shooting area. When a user clicks the recording control on the user interface, the terminal player can notify the terminal renderer to start recording, and push the current frame data of the target object of the panoramic video to the player, so that the player receives the frame data and writes the current frame data into the encoder to generate the target planar video. If it is detected that the target object is missing or lost (for example, the target object disappears in the panoramic image), the video recording can be stopped. Optionally, during the recording process, the viewing angle can be adjusted in various ways (such as adjusting the viewing angle adjustment control on the user interface, long pressing the recording button for sliding operation or gyroscope), and the player can transmit various changed viewing angle data to the renderer, so that the renderer can make corresponding perspective changes.

Optionally, after the target planar videos are generated, the target planar videos can be batch-processed for export. For example, the recorded planar video data can be cropped, and the generated target planar videos can be saved individually to the album page. When exporting, a single target planar video can be cropped accordingly and saved to the album. It is also possible to combine multiple target planar videos in batches to obtain a total target planar video for export. During batch synthesis, one can also first crop the target planar videos that need to be cropped, and then combine all target planar videos into a total target planar video through the encoder.

In another embodiment, when it is detected that the current shooting mode of the shooting device is the panoramic shooting mode, a shooting interface may be displayed on the user interface of the terminal, wherein the shooting interface displays a current shooting picture, and there are multiple candidate subjects displayed in the current shooting picture. Then, the terminal may determine the first target shooting object in response to a selection instruction for the first target shooting object among the candidate shooting objects, where the first target shooting object is correspondingly provided with a first target shooting area. Next, the terminal can determine the first target shooting picture from the current shooting picture based on the first target shooting area and the preset shooting angle, and finally, in response to the video shooting instruction, track and record the first target shooting picture to generate target planar video. Optionally, after tracking and recording the first target shooting picture in response to the video shooting instruction, and before generating the target planar video, the terminal may, in response to a selection instruction for the second target shooting object among the candidate shooting objects, also determine a second target object to be photographed. The first planar video to be processed corresponding to the first target photographed frame can be acquired, wherein the second target object to be photographed is correspondingly provided with a second target photographed area. Then, the terminal may determine a second target shooting picture from the current shooting picture based on the second target shooting area and the preset shooting angle of view, track and record the second target shooting frame, generate a second planar video to be processed, and finally, generating a target planar video based on the first planar video to be processed and the second planar video to be processed.

Accordingly, an embodiment of the present application provides a video processing method, which displays a video frame of a panoramic video through a user interface, and then, in response to a selection operation on the video frame, determines the target to be photographed in the panoramic video, subsequently, acquires the target shooting field of view of the target object in the video frame, and finally, in response to the video shooting instruction, performs video recording on the target object based on the target shooting field of view to generate a target planar video. The embodiment of the present application can obtain the target object in the panoramic video to generate a planar video, and can determine the planar video from the panoramic video according to the user's personalized needs, thereby simplifying the steps of obtaining the target planar video from the panoramic video and improving the efficiency of target planar video acquisition from the panoramic video.

Figure 2:
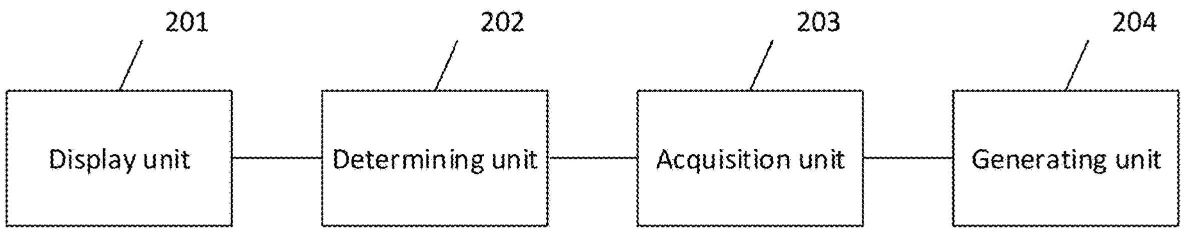
FIG. 2 is an exemplary schematic structural diagram of a video processing device in accordance with various embodiments.

Referring to FIG. 2, FIG. 2 is an exemplary structural block diagram of a video processing device provided in an embodiment. The device includes: a display unit 201, configured to display a video picture of a panoramic video through a user interface; a determining unit 202, configured to determine a target object to be photographed in the panoramic video in response to a selection operation on the video frame; an acquisition unit 203, configured to acquire a target shooting field of view of the target object in the video frame; and a generating unit 204, configured to, in response to a video shooting instruction, record a video of the target object based on the target shooting field of view, and generate a target planar video.

In some embodiments, the device can also include a first generating subunit that is configured to generate a target shooting area based on the target object, wherein the target object is located in the central position of the target shooting area.

In some embodiments, the device can also include a second generating subunit that is configured to, in response to a video shooting instruction, perform video tracking and recording on the target shooting area based on the target shooting field of view, and generate a target planar video.

In some embodiments, the device can comprise: a first determining subunit that is configured to perform a real-time tracking operation on the target object, and determine the real-time position of the target object in the video frame of the panoramic video; a second determining subunit that is used to determine the real-time video picture in the target shooting area in the video picture of the panoramic video based on the real-time position; and a third generating subunit that is configured to perform video tracking and recording on the real-time video images in the target shooting area to generate the target planar video.

In some embodiments, the device can also include a detection unit that is configured to stop video tracking recording when it is detected that the target object does not appear in the video frame of the panoramic video.

In some embodiments, the device can comprise: a third determining subunit, configured to determine a designated shooting area on the user interface in response to a touch operation on the user interface; and a fourth determining subunit, configured to determine the video frame of the panoramic video in the specified shooting area as the target object to be photographed in the panoramic video.

In some embodiments, the device can include a fourth generating subunit that is configured to, in response to a video shooting instruction, perform video recording of video frames in the designated shooting area based on a preset shooting field of view of the designated shooting area, to generate a target planar video.

In some embodiments, the device can comprise: a fifth determining subunit, configured to determine a first position on the user interface in response to a pressing operation on the user interface; and a fifth generation subunit, configured to generate a designated shooting area with the first position and the second position as diagonal corners of a rectangle when it is detected that the press operation is released at the second position on the user interface.

In some embodiments, the device can comprise: a first response unit that is configured to acquire a field of view adjustment parameter in response to a touch operation on the user interface; a first processing unit that is configured to update the target shooting field angle based on the field of view adjustment parameter to obtain an updated target shooting field angle; and a sixth generating subunit that is configured to perform video recording on the target object based on the updated target shooting field of view, and record the planar video according to the target shooting field of view and the updated target shooting field of view Corner recorded planar video to generate target planar video.

In some embodiments, the device can include a first obtaining subunit that is configured to, in response to a sliding operation on the viewing angle adjustment control, obtain a viewing angle adjustment parameter corresponding to the sliding operation.

In some embodiments, the device can comprise: a second acquiring subunit, configured to acquire media information input through the information input control; and a sixth determining subunit, configured to acquire the media information determined by the input determination operation when an input determination operation for the media information is detected, and determine a viewing angle adjustment parameter based on the media information.

In some embodiments, the device can comprise: a third acquisition subunit that is used to acquire video adjustment parameters; a second processing unit that is configured to perform cropping processing on the target planar video based on the video adjustment parameters to obtain the processed target planar video; and a first exporting unit that is configured to export the target planar video based on a preset video format.

In some embodiments, the device can comprise: a fourth acquiring subunit, configured to acquire the target planar video and the planar video to be processed; a third processing unit, configured to perform video splicing processing on the target planar video and the planar video to be processed to obtain a spliced planar video; and a second exporting unit, configured to export the spliced planar video based on a preset video format.

In accordance with various embodiments, a device can be provided for processing junk files. The display unit 201 displays the user interface and the video picture of the panoramic video. The determining unit 202 determines the target object that needs to be photographed in the panoramic video, in response to a selection operation on the video frame. The acquiring unit 203 acquires the target shooting field of view of the target object in the video picture. The generating unit 204, in responds to the video shooting instruction, generates a target planar video based on the target shooting field of view of the target object. Various embodiments can obtain a target object in the panoramic video to generate a planar video, and can determine the planar video required from the panoramic video according to the user's personalized needs, thereby simplifying the steps of obtaining the target planar video from the panoramic video and improving the efficiency of target planar video acquisition from the panoramic video.

Figure 3:
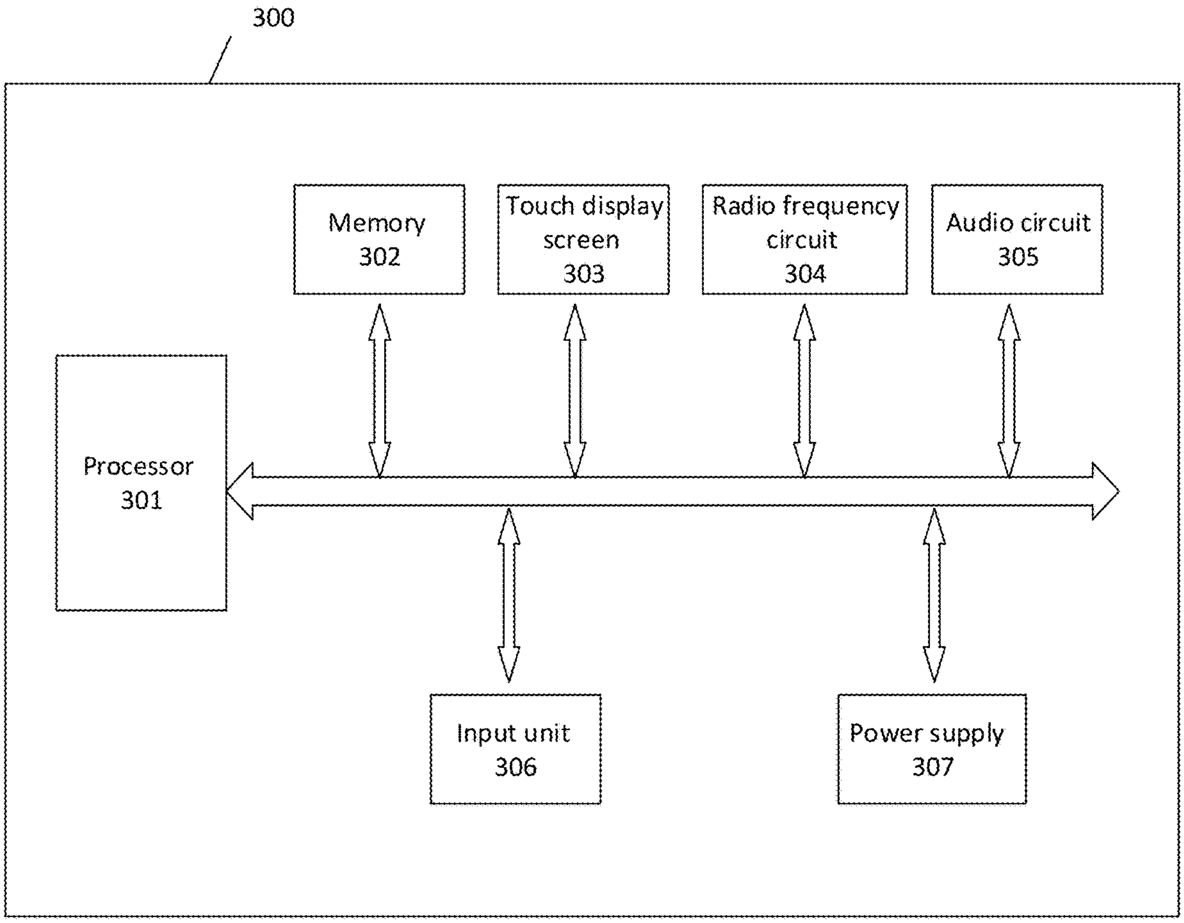
FIG. 3 is an exemplary schematic structural diagram of a computer device in accordance with various embodiments.

In accordance with various embodiments, a computer device can be provided. The computer device can be a terminal or a server, and the terminal can be a smart phone, a tablet computer, a notebook computer, a touch screen, a game machine, a personal computer (PC, Personal Computer), Personal Digital Assistant (PDA) and other terminal devices. Referring to FIG. 3, FIG. 3 is an exemplary schematic structural diagram of a computer device provided in an embodiment of the present application. The computer device 300 includes a processor 301 with one or more processing cores, a memory 302 with one or more storage media, and computer programs stored in the memory 302 and operable on the processor. Wherein, the processor 301 is electrically connected with the memory 302. Those skilled in the art can understand that the structure of the computer equipment shown in the figure does not constitute a limitation to the computer equipment, and may include more or less components than those shown in the figure, or combine some components, or arrange different components.

The processor 301 is the control center of the computer device 300, and uses various interfaces and lines to connect various parts of the entire computer device 300, by running or loading software programs and/or modules stored in the memory 302, and calling the software programs stored in the memory 302, and calling data stored in memory 302, to execute various functions of the computer device 300 and process data, so as to monitor the computer device 300 as a whole.

In accordance with various embodiments, the processor 301 in the computer device 300 can follow the steps below to load the instructions corresponding to the process of one or more application programs into the memory 302, and the processor 301 can execute the instructions stored in the memory 302 in order to achieve various functions: displaying a video picture of a panoramic video through a user interface; determining a target object to be photographed in the panoramic video in response to a selection operation on the video picture; acquiring the target shooting field of view of the target object in the video picture; and in response to a video shooting instruction, performing video recording on the target object based on the target shooting field of view to generate a target planar video For the various exemplary implementation of the above operations, reference may be made to the foregoing embodiments.

Optionally, as shown in FIG. 3, the computer device 300 further comprises: a touch display screen 303, a radio frequency circuit 304, an audio circuit 305, an input unit 306 and a power supply 307, wherein, the processor 301 can be electrically connected to the touch display screen 303, the radio frequency circuit 304, the audio circuit 305, the input unit 306 and the power supply 307 respectively. Those skilled in the art can understand that the structure of the computer device shown in FIG. 3 is not limited to the computer device and may include more or less components than shown in the figure, or combine various components, or have different component arrangement.

The touch display screen 303 can be used for displaying a graphical user interface and receiving operation instructions generated by the user acting on the graphical user interface. The touch display screen 303 may include a display panel and a touch panel. Among them, the display panel can be used to display information input by or provided to users and various graphical user interfaces of computer equipment, and these graphical user interfaces can be composed of graphics, text, icons, videos and any combination thereof. Optionally, the display panel may be configured in the form of a liquid crystal display (LCD, Liquid Crystal Display), an organic light-emitting diode (OLED, Organic Light-Emitting Diode), or the like. The touch panel can be used to collect the user's touch operation on or near it (such as the user's operation on or near the touch panel using any suitable object or accessory such as a finger or a stylus) and generate corresponding operations instruction, and the operation instruction executes the corresponding program. Optionally, the touch panel may include two parts: a touch detection device and a touch controller. Among them, the touch detection device detects the user's touch orientation, and detects the signal brought by the touch operation, and transmits the signal to the touch controller; the touch controller receives the touch information from the touch detection device, converts it into contact coordinates, and sends it to the processor 301, and can receive and execute commands sent by the processor 301. The touch panel can cover the display panel, and when the touch panel detects a touch operation on or near it, the touch panel can send the signal to the processor 301 to determine the type of the touch event, and then the processor 301 can provide corresponding visual output on the display panel according to the type of the touch event. In various embodiments, the touch panel and the display panel can be integrated into the touch display screen 303 to realize input and output functions. However, in some embodiments, the touch panel and the display panel can be used as two independent components to implement input and output functions. That is, the touch screen 303 can also serve as a part of the input unit 306 to implement an input function.

In accordance with various embodiments, the processor 301 can execute an application program to generate a graphical interface on the touch screen 303. The touch display screen 303 can be used for presenting a graphical interface and receiving operation instructions generated by the user acting on the graphical interface.

The radio frequency circuit 304 can be used to send and receive radio frequency signals to establish wireless communication with network equipment or other computer equipment through wireless communication, and to send and receive signals with network equipment or other computer equipment.

The audio circuit 305 may be used to provide an audio interface between the user and the computer device through speakers and microphones. The audio circuit 305 can transmit the electrical signal converted from the received audio data to the speaker, and the speaker can convert the electrical signal into an audio signal for output. On the other hand, the microphone can convert the collected audio signal into an electrical signal, which can be converted into audio data by the audio circuit 305. After being processed by the output processor 301, the audio data can be sent to another computer device through the radio frequency circuit 304, or the audio data can be output to the memory 302 for further processing. Audio circuitry 305 may also include an earphone jack to provide peripheral headphones for communication with the computer device.

The input unit 306 can be used to receive input numbers, character information or user characteristic information (such as fingerprints, iris, face information, etc.), and generate keyboard, mouse, joystick, optical or trackball signal input related to user settings and function control.

The power supply 307 can be used to supply power to various components of the computer device 300. Optionally, the power supply 307 may be logically connected to the processor 301 through a power management system, so as to implement functions such as management of charging, discharging, and power consumption through the power management system. The power supply 307 may also include one or more DC or AC power supplies, recharging systems, power failure detection circuits, power converters or inverters, power status indicators and other arbitrary components.

Although not shown in FIG. 3, the computer device 300 may also include a camera, a sensor, a Wi-Fi module, a Bluetooth module, etc.

In the foregoing embodiments, the descriptions of each embodiment have their own emphases, and for parts not described in detail in a certain embodiment, reference may be made to relevant descriptions of other embodiments.

As can be seen from the above, the computer device provided in the various embodiments can display a video picture of the panoramic video through the user interface, and then, in response to a selection operation on the video picture, can determine a target object to be photographed in the panoramic video, and then, can acquire the target shooting field of view of the target object in the video frame, and finally, in response to a video shooting instruction, can perform video recording on the target object based on the target shooting field of view to generate a target planar video. Various embodiments can obtain the target object in the panoramic video to generate a planar video, and can determine the planar video from the panoramic video according to the user's personalized needs, thereby simplifying the steps of obtaining the target planar video from the panoramic video and improving the efficiency of target planar video acquisition from the panoramic video.

Those of ordinary skill in the art can understand that all or part of the steps in the various methods of the above-mentioned embodiments can be completed by instructions, or by using instructions to control related hardware, and the instructions can be stored in a storage medium (such as a computer-readable storage medium), and is loaded and executed by the processor.

In accordance with various embodiments a plurality of computer programs can be stored in a storage medium, and the computer programs can be loaded by a processor to execute the steps in any video processing method provided in the embodiments of the present application. For example, the computer program can perform the following steps: displaying a video picture of a panoramic video through a user interface; determining a target object to be photographed in the panoramic video in response to a selection operation on the video picture; acquiring the target shooting field of view of the target object in the video picture; and, in response to a video shooting instruction, performing video recording on the target object based on the target shooting field of view to generate a target planar video.

For the specific implementation of the above operations, reference may be made to the foregoing embodiments, and details are not repeated here.

Wherein, the storage medium may include: a read-only memory (ROM, Read Only Memory), a random-access memory (RAM, Random Access Memory), a magnetic disk or an optical disk, and the like.

Since the computer program stored in the storage medium can execute the steps in any video processing method provided by the various embodiments of the present application, it can realize any video processing method provided by the various embodiments of the present application. For the beneficial effects, see the previous embodiments for details, and will not be repeated here.

In the foregoing embodiments, the descriptions of each embodiment have their own emphases, and for parts not described in detail in a certain embodiment, reference may be made to relevant descriptions of other embodiments.

A video processing method, device, computer equipment, and storage medium provided by the various embodiments of the present application have been described above. Specific examples are used to illustrate the principles and implementation methods of the present application. The description of the above embodiments is only used to help understand the technical solution and its core idea of the present application, those skilled in the art should understand that the technical solutions recorded in the foregoing embodiments can be further modified, or provided with equivalent replacements for some of the technical features; and these modifications or replacements do not make the essence of the corresponding technical solutions depart from the scope of the technical solutions of the embodiments described in the present application.

What is claimed is:

1. A video processing method, comprising:

displaying a video picture of a panoramic video through a user interface;

determining a target object to be photographed in the panoramic video in response to a selection operation on the video picture;

acquiring a target shooting field of view of the target object in the video picture; and in response to a video shooting instruction, performing video recording on the target object based on the target shooting field of view to generate a target planar video, wherein the video processing method further comprises:

after determining the target object to be photographed in the panoramic video in response to the selection operation on the picture, generating a target shooting area based on the target object;

the performing video recording of the target object based on the target shooting field of view to generate the target planar video comprises:

in response to the video shooting instruction, performing video tracking and recording on the target shooting area based on the target shooting field of view to generate the target planar video; and the performing video tracking and recording on the target shooting area based on the target shooting field of view to generate a target planar video comprises:

stopping video tracking and recording when it is detected that the target object does not appear in the video picture of the panoramic video.

2. The video processing method according to claim 1, wherein the target object comprises a target person or a target scene.

3. The video processing method according to claim 1, wherein the target object is located at a central position of the target shooting area.

4. The video processing method according to claim 1, wherein the performing video tracking and recording on the target shooting area based on the target shooting field of view to generate the target planar video comprises:

performing a real-time tracking operation on the target object to determine a real-time position of the target object in the video picture of the panoramic video;

determining a real-time video picture in the target shooting area in the video picture of the panoramic video based on the real-time position; and performing video tracking and recording on the real-time video pictures in the target shooting area to generate the target planar video.

5. The video processing method according to claim 1, wherein a position of the target planar video in the panoramic video can be displayed in real time through a small window in a preset display area of the user interface.

6. The video processing method according to claim 1, wherein the target planar video is generated based on a first planar video to be processed and a second planar video to be processed, and wherein the first planar video to be processed is generated by tracking and recording the target object and the second planar video to be processed is generated by tracking and recording another target object.

7. The video processing method according to claim 1, wherein the determining the target object to be photographed in the panoramic video in response to a selection operation on the picture comprises:

determining a designated shooting area on the user interface in response to a touch operation on the user interface; and causing a video picture of the panoramic video in the designated shooting area to be determined as a target object to be photographed in the panoramic video.

8. The video processing method according to claim 7, wherein the performing video recording of the target object based on the target shooting field of view to generate the target planar video comprises:

in response to the video shooting instruction, performing video recording on the video pictures in the designated shooting area based on a preset shooting field of view of the designated shooting area to generate a target planar video.

9. The video processing method according to claim 7, wherein the determining a designated shooting area on the user interface in response to the touch operation on the user interface comprises:

determining a first position on the user interface in response to a pressing operation on the user interface; and generating the designated shooting area with the first position and a second position as diagonal corners of a rectangle, when it is detected that the pressing operation is released at the second position on the user interface.

10. A video processing method, comprising:

displaying a video picture of a panoramic video through a user interface;

determining a target object to be photographed in the panoramic video in response to a selection operation on the video picture;

acquiring a target shooting field of view of the target object in the video picture; and in response to a video shooting instruction, performing video recording on the target object based on the target shooting field of view to generate a target planar video, wherein the performing video recording of the target object based on the target shooting field of view comprises:

in response to a touch operation on the user interface, acquiring a field of view adjustment parameter;

updating the target shooting field of view based on the field of view adjustment parameter to obtain an updated target shooting field of view; and performing video recording on the target object based on the updated target shooting field of view, and generating the target planar video according to the planar video recorded by the target shooting field of view and the planar video recorded by the updated target shooting field of view video.

11. The video processing method according to claim 10, further comprising:

obtaining video adjustment parameters;

performing cropping processing on the target planar video based on the video adjustment parameters to obtain a processed target planar video; and exporting the target planar video based on a preset video format.

12. The video processing method according to claim 10, further comprising:

exporting the target planar video and saving the target planar video to an album page of a terminal; or exporting the target planar video after cropping processing and saving the cropped target planar video to the album page of the terminal.

13. The video processing method according to claim 10, further comprising:

when there are multiple target planar videos, combining the target planar videos into one total target planar video for export, and saving the total target planar video to an album page of a terminal; or combining the plurality of target planar videos after cropping processing into one total target planar video for export, and saving the total target planar video to the album page of the terminal.

14. The video processing method according to claim 10, wherein the shooting interface displays a field of view adjustment control.

15. The video processing method according to claim 14, wherein the acquiring the field of view adjustment parameter in response to the touch operation on the user interface comprises:

in response to a sliding operation on the field of view adjustment control, acquiring the viewing angle adjustment parameter corresponding to the sliding operation.

16. The video processing method according to claim 10, wherein an information input control is displayed on the shooting interface.

17. The video processing method according to claim 16, wherein the acquiring the field of view adjustment parameter in response to the touch operation on the user interface comprises:

acquiring media information input through the information input control; and when an input determination operation for the media information is detected, acquiring the media information determined by the input determination operation, and determining the field of view adjustment parameter based on the media information.

18. A video processing method, comprising:

displaying a video picture of a panoramic video through a user interface;

determining a target object to be photographed in the panoramic video in response to a selection operation on the video picture;

acquiring a target shooting field of view of the target object in the video picture;

in response to a video shooting instruction, performing video recording on the target object based on the target shooting field of view to generate a target planar video;

obtaining the target planar video and a planar video to be processed;

performing video splicing processing on the target planar video and the planar video to be processed to obtain a spliced planar video; and exporting the spliced planar video based on a preset video format.

19. The video processing method according to claim 18, wherein the planar video to be processed is generated by tracking and recording another target object.

* * * * *